United States Patent [19]

Zazzera

[11] Patent Number: 5,511,117
[45] Date of Patent: Apr. 23, 1996

[54] INTEGRATED VOICE AND BUSINESS TRANSACTION REPORTING FOR TELEPHONE CALL CENTERS

[76] Inventor: Andre C. Zazzera, 1465 S. Tyler Rd., St. Charles, Ill. 60174

[21] Appl. No.: 312,347

[22] Filed: Sep. 26, 1994

[51] Int. Cl.$^6$ .......................... H04M 15/00; H04M 3/00
[52] U.S. Cl. .......................... 379/265; 379/116; 379/119; 379/135; 379/309
[58] Field of Search .................... 379/113, 114, 379/115, 116, 119, 127, 133, 134, 135, 136, 265, 266, 309

[56] References Cited

U.S. PATENT DOCUMENTS 4,975,945  12/1990  Carbullido ..................... 379/265 X
5,181,239  1/1993  Jolissaint ....................... 379/265 X Primary Examiner—Jeffery Hofsass
Assistant Examiner—Harry S. Hong

[57] ABSTRACT

An integrated voice and data business transaction detail reporting system for a telephone system (12), having a switch (14) for directing incoming telephone calls, a device (14) for generating information pertaining to voice of the incoming calls, a device (26) for generating business transaction data pertaining to the incoming calls, and a device (24) for correlating the voice information and business transaction data.

5 Claims, 2 Drawing Sheets

5,511,117

INTEGRATED VOICE AND BUSINESS TRANSACTION REPORTING FOR TELEPHONE CALL CENTERS

BACKGROUND OF THE INVENTION

The present invention relates to voice and business transaction reporting systems for telephone call centers.

In the past, telephone call centers have been provided with two major systems, an Automatic Call Distributor (ACD) and a business data system comprising a host computer. The call centers use ACD-generated call statistics to govern the operation on a day-to-day basis. This information tells the administrative staff how well the calls are being answered, and generally how well the staff that is answering the phones are performing. However, these ACD reports concentrate on the elements of the voice call only, and are oblivious to the elements of the business transaction that is logged on the business data system. It is this data system that records and reports the customer sale, reservation, or complaint, etc. and resulting benefit. Because two disparate systems are used for business management, with each providing detail on their respective pieces of the transaction with the customer, a significant blind spot exits that can lead the call center manager to make erroneous decisions to the detriment of the business.

The ACD generated information is typically available in real-time and summarized in 15 to 30 minute time periods. The information from the data system is usually batched and available on a daily basis, well after the time that the business was transacted. As a result, call centers use the ACD information as the driver to customer satisfaction, as it provides the best granularity and is available as quickly as technically possible.

This approach to managing the business based on call information may be likened to an air traffic controller managing many airplanes coming into an airport from information generated by two separate systems: one provides data on the plane's distance from the airport, and one provides data on the altitude of the airplane. Suppose that only the distance data was available in real-time and altitude information comes in a report received the next day. It would be virtually impossible to avoid catastrophe if these were the only tools available, yet call centers are managed minute-to-minute using call data which is only one-half of the necessary data required to make accurate decisions.

SUMMARY OF THE INVENTION

A principal feature of the present invention is the provision of an integrated voice and data business transaction detail reporting system for a call center of a telephone system.

The system of the present invention comprises, switch means for directing incoming telephone calls, means for generating information pertaining to voice of the incoming calls, and means for generating business transaction data pertaining to the incoming calls.

A feature of the present invention is the provision of means for correlating the voice information and business transaction data.

Another feature of the invention is that a report may be made of the correlated information and data.

Yet another feature of the invention is that better informed management decisions may be based upon significantly increased information incorporated in the report.

Still another feature of the invention is that the report of information and data may be formed in a simplified and rapid manner.

Further features will become more fully apparent in the following description of the embodiments of the invention, and from the appended claims.

DESCRIPTION OF PREFERRED EMBODIMENTS

Figure 1:
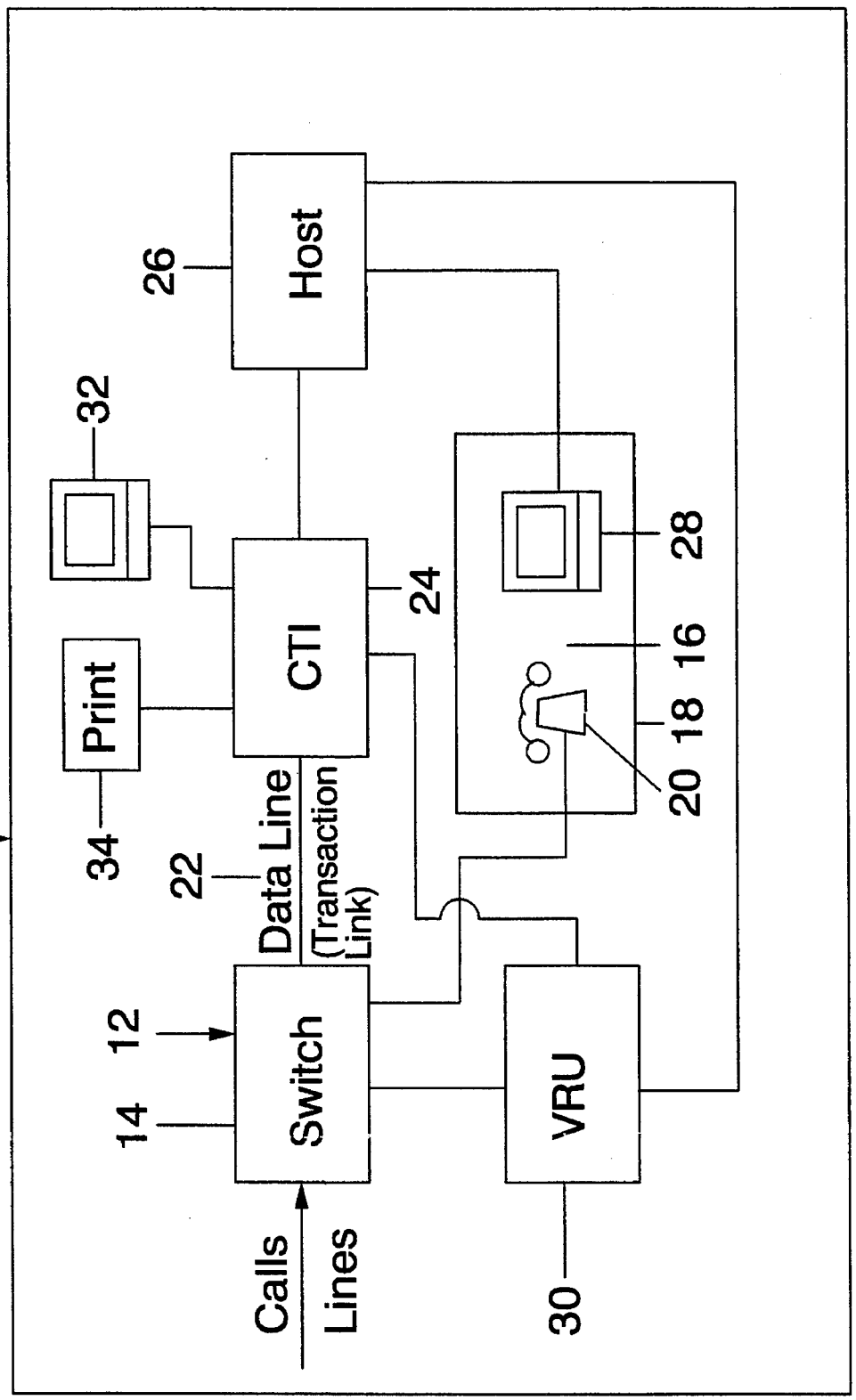
FIG. 1 is a diagrammatic view of an integrated voice and data business detail reporting system for a telephone system of the present invention.

Referring now to FIG. 1, there is shown a call center generally designated 10 for a telephone system generally designated 12. The call center 10 has a switch comprising an Automatic Call Distributor (ACD) 14 for routing incoming telephone calls to one of a plurality of agents 16 in a work station 18 commonly on the basis of the agent most available to answer the call, with the agents 16 having suitable voice equipment, such as a telephone 20.

The ACD is connected over a transaction link or data line 22 to a Computer-Telephone-Integration (CTI) device 24 which may comprise a suitable computer in order to supply information relating to voice from the ACD to the CTI. In turn, the CTI is connected to a host computer 26 in order to supply information relating to voice from the ACD to the host computer 26. The host computer 26 processes the information from the ACD, and generates data pertaining to the voice data, such as ANI (the caller's telephone number) and DNIS (the telephone number which was dialed), and supplies such information to the agent 16 on a suitable display (Cathode Ray Tube (CRT)) 28 at the work station 18. Using the information from the ACD and the host computer 26, the agent 16 processes the incoming telephone call.

The information supplied by the ACD is primarily related to voice information only pertaining to the incoming call, such as the queue time of the call or the duration of handling the calls, while the host computer 26 typically logs information pertaining to the business transaction itself, such as the number of transactions, and the number of sales per representative. In the past, this information has not been correlated by the system 12.

Thus, in the past, telephone call centers 10 have been provided with the two major systems, the Automatic Call Distributor (ACD) and the business data system comprising a host computer 26. The call centers use ACD-generated call statistics to govern the operation on a day-to-day basis. This information tells the administrative staff how well the calls are being answered and generally how well the staff that is answering the phones are performing. However, these ACD reports concentrate on the elements of the voice call only, and are oblivious to the elements of the business transaction that is logged on the business data system. It is this data system that records and reports the customer sale, reservation, or complaint, etc. and resulting benefit. Because two disparate systems are used for business management, with each providing detail on their respective pieces of the transaction with the customer, a significant blind spot exits that can lead the call center manager to make erroneous decisions to the detriment of the business.

The ACD generated information is typically available in real-time and summarized in 15 to 30 minute time periods. The information from the data system is usually batched and available on a daily basis, well after the time that the business was transacted. As a result, call centers use the ACD information as the driver to customer satisfaction, as it provides the best granularity and is available as quickly as technically possible.

In accordance with the present invention, the information pertaining to voice, such as supplied by the ACD, and a Voice Response Unit (VRU) 30 connected to the ACD, is correlated with the information pertaining to the business transaction generated by the host computer 26. The information pertaining to voice typically has times assigned to the various events, and the information pertaining to the business transactions in the host computer 26 is assigned times in order to better correlate the information.

Figure 2:
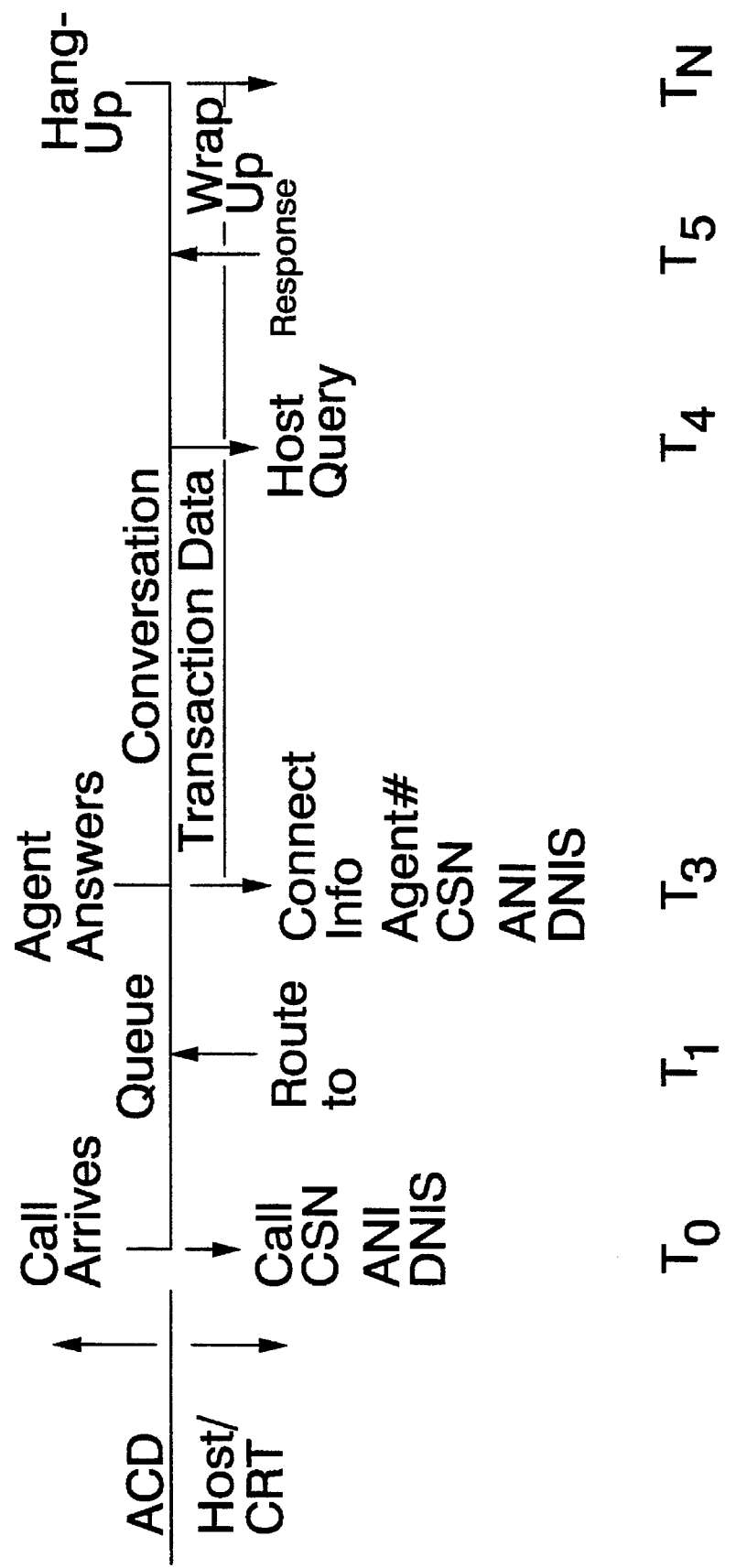
FIG. 2 is a diagrammatic view of the correlation between voice information and business transaction data.

A diagram of the interaction between the ACD and the host computer 26 and display 28 is shown in FIG. 2. When the call first arrives, information pertaining to the call, such as ANI and DNIS, is prepared for display on the agent's display 28 at Time $T_0$. If desired, the host computer 26 may route the call to a particular agent at the time $T_1$. At the time $T_3$, an agent answers the call, and the information from the host computer 26, such as ANI and DNIS, is connected to the display 28 of the particular agent 16. At the time $T_4$, an inquiry is made by the agent 16 to the host computer 26, and a response is supplied by the host computer 26 to the agent 16 at the time $T_5$. Finally, at the time $T_N$ the call is wrapped up by the host computer 26, and the agent 16 hangs up.

In order to create generic integrated voice and data business transaction detail, an Applications Programming Interface (API) is created to transport in real-time elements of the ACD and PBX voice call (i.e., call arrives, call goes into queue, call is answered, etc.) and elements of the data transaction (keystrokes, data field, host responses, etc) to a common database that combines this disparate information into single records (voice+data) on an individual transaction basis.

The message sets and formats is termed Detail Reporting Applications Programming Interface (DRAPI) which is necessary to effect this reporting functionality in any call center environment. The components included in DRAPI are any mix of the following:

ACD, PBX, or any platform capable of switching calls

Voice Response Platform

Host or server resident applications and hardware

Voice Mail system

Individual intelligent or dumb workstations

Terminals (video display or printers) used to present the data

The business applications used to support the transactions

Computer-Telephone-Integration (CTI) applications and servers

Detail Reporting server (could be included in various components listed)

All of the components would converse to the Detail Reporting (DR) server or application via a standard message set (DRAPI) in real-time, event-by-event. In applications where real-time communications is not possible, transaction serial numbers may be used to track and later consolidate events sent to the DR server.

The DRAPI can be adopted by any application used in call centers and provide a single, all encompassing message set to transport the data to a common data base.

An example of DR fields are as follows, and each includes transaction data, success and failed indicators, and timings for each element:

Screen arrival time

Queue Time

VRU transaction data

Call routing information (based on customer account data, ANI, etc.)

Destination agent

Data captured

Host (server) turnaround time

Host (server) data

Transaction type

Outdial activity

Transfer activity

Notes/comments/massaging

Wrap-up data

The data relating to voice and business transactions may be correlated or assimilated either in the host computer 26, the CTI 24, or the ACD, as desired. In suitable form, the CTI may be connected to a second display 32, such as a Cathode Ray Tube (CRT), or a printer 34 in order to supply the combined voice and business data report to a manager, in the case of being processed in the CTI. The second display 32 and printer 34 may be connected to other parts of the system 12 where the data is otherwise assimilated.

Thus, in accordance with the present invention, the information pertaining to voice is combined with the business transaction data on the particular calls, and a report is prepared for the manager of the call center. As an example of the correlated data, the number of sales may be correlated with the duration of the calls. In this manner, decisions may be made by the manager or supervisor based on more complete information rather than by this data separately. This correlation of data may be formed in a simplified manner, and may be prepared for the person when needed.

The foregoing detailed description has been given for clearness of understanding only, and no unnecessary limitations should be understood therefrom, as modification swill be obvious to those skilled in the art.

What is claimed is:

1. An integrated voice and data business transaction detail reporting for a call center of a telephone system, comprising:

an automatic call distributor for directing incoming calls to a plurality of agents, and for generating information pertaining to the voice of the calls;

a host computer for supplying information to the agents, and for generating business transaction data pertaining to the incoming calls and the action of the agents; and means for correlating the voice information and business transaction data in real time and for generating a written report containing the combined information and data in real time.

2. The system of claim 1 wherein the host computer correlates the information and data.

3. The system of claim 1 wherein the automatic call distributor correlates the information and data.

4. The system of claim 1 including a computer-telephone-integration device communicating with the automatic call distributor and host computer, and in which the computer-telephone-integration device correlates the information and data.

5. The system of claim 4 wherein the computer-telephone-integration device prepares a report of the correlated information and data.

* * * * *